United States Patent
Liang et al.

(10) Patent No.: US 7,315,887 B1
(45) Date of Patent: Jan. 1, 2008

(54) FACILITATING INTEGRATION OF COMMUNICATIONS NETWORK EQUIPMENT INVENTORY MANAGEMENT

(75) Inventors: Yao Liang, Raleigh, NC (US); Maurice Lanman, Fort Worth, TX (US)

(73) Assignee: Alcatel Lucent, Paris (FR)

( * ) Notice: Subject to any disclaimer, the term of this patent is extended or adjusted under 35 U.S.C. 154(b) by 953 days.

(21) Appl. No.: 09/833,085

(22) Filed: Apr. 11, 2001

(51) Int. Cl.
  *G06F 15/173* (2006.01)
(52) U.S. Cl. ............ 709/223; 705/28; 235/462.01
(58) Field of Classification Search ............ 705/28, 705/29, 27; 707/3, 10, 100, 104.1; 709/203, 709/223, 224, 229, 206; 715/736–739; 235/383, 235/462.01
  See application file for complete search history.

(56) References Cited

U.S. PATENT DOCUMENTS

| | | | | |
|---|---|---|---|---|
| 4,829,445 A | * | 5/1989 | Burney ............... 700/230 |
| 5,712,989 A | * | 1/1998 | Johnson et al. ........ 705/28 |
| 5,774,876 A | * | 6/1998 | Woolley et al. ........ 705/26 |
| 5,778,381 A | * | 7/1998 | Sandifer ............ 707/104.1 |
| 5,784,646 A | * | 7/1998 | Sawada ............... 710/38 |
| 5,959,275 A | * | 9/1999 | Hughes et al. ......... 235/375 |
| 5,959,568 A | * | 9/1999 | Woolley ............... 342/42 |
| 5,987,474 A | * | 11/1999 | Sandifer ............ 707/104.1 |
| 6,064,979 A | * | 5/2000 | Perkowski ............. 705/26 |
| 6,085,262 A | * | 7/2000 | Sawada ............... 710/38 |
| 6,138,249 A | | 10/2000 | Nolet |
| 6,246,995 B1 | * | 6/2001 | Walter et al. .......... 705/22 |
| 6,292,806 B1 | * | 9/2001 | Sandifer ............ 707/104.1 |
| 6,303,395 B1 | * | 10/2001 | Nulman ............... 438/14 |
| 6,386,450 B1 | * | 5/2002 | Ogasawara ............ 235/383 |
| 6,574,655 B1 | * | 6/2003 | Libert et al. .......... 709/200 |
| 6,587,835 B1 | * | 7/2003 | Treyz et al. .......... 705/14 |
| 6,604,681 B1 | * | 8/2003 | Burke et al. ......... 235/383 |
| 6,618,630 B1 | * | 9/2003 | Jundt et al. .......... 700/17 |
| 6,640,246 B1 | * | 10/2003 | Gary et al. .......... 709/223 |
| 6,684,180 B2 | * | 1/2004 | Edwards et al. ....... 702/184 |
| 6,693,511 B1 | * | 2/2004 | Seal ................ 340/10.1 |
| 6,708,208 B1 | * | 3/2004 | Philyaw ............. 709/223 |
| 6,823,379 B1 | * | 11/2004 | Heckel et al. ........ 709/224 |
| 6,868,443 B1 | * | 3/2005 | Deslandes et al. ..... 709/223 |
| 6,877,661 B2 | * | 4/2005 | Webb et al. ......... 235/462.01 |
| 6,947,959 B1 | * | 9/2005 | Gill ................. 715/501.1 |

(Continued)

FOREIGN PATENT DOCUMENTS

WO    WO 98/52321    11/1998

*Primary Examiner*—Andrew Joseph Rudy
(74) *Attorney, Agent, or Firm*—Raymond M. Galasso, P.C.; Jessica W. Smith; Craig A. Hoersten

(57) ABSTRACT

A physical asset management system as disclosed herein is capable of carrying-out a method for facilitating integration of communications network equipment inventory management. In at least one embodiment of the method for facilitating integration of communications network equipment inventory management, the method includes assigning system-readable identification to an asset item of a communication network, receiving the system-readable identification of the asset item at a physical asset manager in response to installing the asset item in the communication network, and creating an informational link between an on-line sub-object of the asset item and an off-line sub-object of the asset item. The system-readable identification enables the physical asset manager to create the informational link between the on-line sub-object of the asset item and the off-line sub-object of the asset item.

34 Claims, 8 Drawing Sheets

U.S. PATENT DOCUMENTS 6,952,680 B1 * 10/2005 Melby et al. .................. 705/28
6,959,235 B1 * 10/2005 Abdel-Malek et al. ........ 701/33
7,058,154 B1 *  6/2006 Stark et al. ................. 376/250
7,130,807 B1 * 10/2006 Mikurak ........................ 705/7
7,130,885 B2 * 10/2006 Chandra et al. ............ 709/206

* cited by examiner

FACILITATING INTEGRATION OF COMMUNICATIONS NETWORK EQUIPMENT INVENTORY MANAGEMENT

FIELD OF THE DISCLOSURE

The disclosures herein relate generally to communications networks and more particularly to facilitating integration of communications network equipment inventory management systems.

BACKGROUND

Communications networks such as telecommunications networks comprise network equipment such as network elements, boards, software and the like. The operation, maintenance and expansion of communications networks results in some network equipment being on-line while others are off-line. Network equipment may be off-line for any number of reasons. For example, some network equipment may be new and not yet installed while other network equipment may be previously installed network equipment that is undergoing repair, evaluation and/or upgrade.

Communications networks often include a network management system capable of providing some degree of network resource and network inventory management functionality. In a conventional network management system, two separate physical equipment inventory management applications are used for providing network equipment inventory management capability. A first physical equipment inventory management application is used for managing on-line network equipment and a second physical equipment inventory management application is used for managing off-line network equipment. Without the functionality of these two physical equipment inventory management applications being integrated, the ability to effectively optimize the planning and utility of network equipment is limited.

Accordingly, integrating inventory management of on-line and off-line communications network equipment is useful for facilitating planning and utility of network equipment in a cost-effective manner.

SUMMARY OF THE DISCLOSURE

One embodiment of a method for facilitating the management of a communication network asset item as disclosed herein includes assigning system-readable identification to an asset item of a communication network, receiving the system-readable identification of the asset item at a physical asset manager in response to installing the asset item in the communication network, and creating an informational link between an on-line sub-object of the asset item and an off-line sub-object of the asset item. The system-readable identification enables the physical asset manager to create the informational link between the on-line sub-object of the asset item and the off-line sub-object of the asset item.

DETAILED DESCRIPTION

From a communication equipment resource administration perspective, physical equipment inventory management is an integral management viewpoint covering on-line and off-line equipment items. This viewpoint supports the ability for network operators to optimize their network planning, equipment resource utility, and management quality. Many network operators/service providers either already have their own off-line inventory database system (such as part of their corporate data warehouse) or want to have their own choice of off-line database product. A component-based architecture provides flexibility for accommodating either of these conditions.

Figure 1:
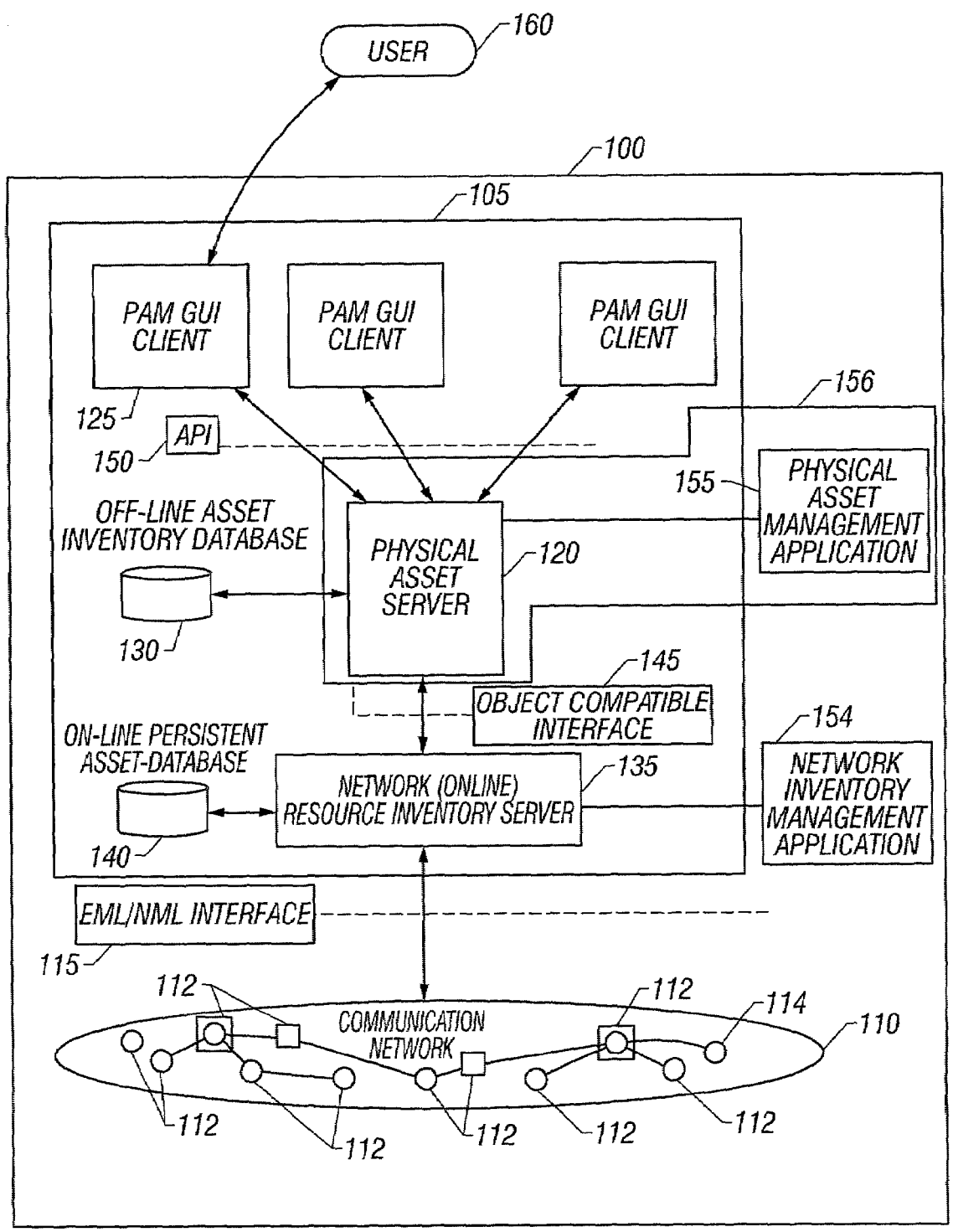
FIG. 1 is a block diagram view depicting an embodiment of a communication network apparatus including a physical asset management (PAM) system.

As depicted in FIG. 1, an embodiment of a communication network apparatus 100 includes physical asset management (PAM) system 105 having a component-based architecture and a communication network 110 connected to the physical asset management system 105. A stand-alone computer network, a standalone telecommunication network and an integrated computer-telecommunication network are examples of the communication network 110. The communication network 110 includes a plurality of network assets items 112. Network elements, boards, equipment holder bays and shelves, software, equipment protection groups and equipment management systems are examples of the plurality of network assets items 112. The network also includes one or more element management systems 114. Each element management system 114 includes an element management system (EMS)/network element (NE) agent. The EMS/NE agent enables administrative operations for asset items associated with the EMS to be facilitated.

The physical asset management system 105 is connected to the communication network 110 via an element management layer-to-network management layer (EML/NML) interface 115. An information model Q3 interface is an example of the EML/NML interface 115. It should be understood that the systems and apparatuses disclosed herein are not reliant on any one particular EML/NML interface 115. Accordingly, it is contemplated that other types of EML/NML interfaces such as COBRA, SNMP or proprietary interfaces may be used.

The physical asset management system 105 includes a physical asset server 120 having a PAM graphical user interface (GUI) client 125, an off-line asset inventory database 130, a network resource inventory server 135 and an on-line persistent asset database 140 connected thereto. The PAM graphical user interface client 125 supports the display of information on a visual display and/or the selection of information via the visual display. It is contemplated that more than one graphical user interface client may be connected to the physical asset server 120. The on-line persistent asset database 140 is connected to the physical asset server 120 through the network resource inventory server 135.

In at least one embodiment of the PAM graphical user interface client 125, the PAM graphical user interface client 125 of the physical asset management system 105 includes a plurality of graphical user interface modes. A table display mode and a graphical display mode are two examples of the plurality of graphical user interface modes. The table display mode provides query functionality via a table-like format. The graphical display mode provides query functionality through clicking of a cursor on an interested subject and/or by moving the cursor onto a displayed subject area.

The off-line asset inventory database 130 and the on-line persistent asset database 140 are standalone sub-systems. These standalone subsystems—the off-line asset inventory database 130 and the on-line persistent asset database 140—are incorporated with each other through the physical equipment server 120. In this manner, an integral equipment inventory management view is capable of being provided. In other embodiments (not shown), it is contemplated that the off-line asset inventory database 130 and the on-line persistent asset database 140 are integrated sub-systems rather than standalone sub-systems.

The physical asset server 120 is connected to the network resource inventory server 135 via an object compatible interface 145. Interfaces compatible with the Object Database Management Group version 2.0 standard are examples of the object compatible interface 145. The PAM graphical user client interface 125 is connected to the physical asset server 120 via an Application Programming Interface (API) 150.

As depicted in FIG. 1, the functional architecture for the physical asset management system 105 comprises the physical asset server 120 and the PAM graphical user interface client 125 for enabling the user 160 to perform physical asset administration and configuration. The user 160 can view, edit and configure equipment resource via the PAM graphical user interface 125. The API 150 enables the PAM graphical user interface client 125 to access physical asset information and to configure equipment features at the physical asset server 120.

From an equipment resource administration aspect, the physical asset management system 105 enables the management of installed online equipment inventory items to be monitored and of not-installed off-line equipment inventory items such as equipment items in stock and undergoing repair. The off-line asset inventory database 130, FIG. 1, is logically separated from the online persistent database 140 and, in at least one embodiment, is physically separated from the online persistent database 140.

A broad interpretation of physical asset management includes managing both on-line and off-line asset items. A narrow meaning of physical asset management includes only managing on-line asset items. Physical asset management via the physical asset management system 105 includes managing assets items according to the broad meaning of physical inventory management.

The apparatus 100 includes a network inventory management application 154 that is accessible by the network resource inventory server 135. The network inventory management application 154 is a network management layer (NML) application that performs network resource inventory management. The network inventory management application also provides a core network resource repository for other network management layer applications. This network resource repository is the place where these other network management layer applications may access certain resource data. It is contemplated that the network inventory management application may include additional capacity for supporting other network management layer application, such as a topology management application, a circuit management application and the like. The network inventory management application 154 may be accessible by the network resource inventory server 135 via a computer readable medium such as, for example, a compact disk, a data storage device, or a network interface.

The apparatus 100 includes a physical asset management application 155 that is accessible by the physical asset server 120, thus comprising a physical asset manager 156. The physical asset management application 155 is a network management layer (NML) application that performs the network equipment resource administration and network equipment configuration management. The physical asset management application 155 may be accessible by the physical asset server 120 via a computer readable medium such as, for example, a compact disk, a data storage device, or a network interface.

In at least one embodiment of the physical asset management application 155 and the network inventory management application 154, the physical asset management application 155 and the network inventory management application 154 are computer programs processable by the physical asset server 120 and the network resource inventory server 135, respectively. The physical asset management application 155 and the network inventory management application 154 enable facilitation of at least a portion of the operations performed via the physical asset server 120 and via the network resource server 135, respectively, for accomplishing the methods disclosed herein. The physical asset management application 155 and the network inventory management application 154 are accessible by the physical asset management application 155 and the network inventory management application 154, respectively, from an apparatus such as a diskette, a compact disk, a network storage device or other suitable apparatus.

In at least one embodiment of the physical asset management application 155, the physical asset management application 155 has the capability for supporting the following activities.

1. Management of equipment items undergoing a repair process and for management of equipment items in stock such as a warehouse location.
2. Being alerted and/or communicating alerts when stock of a given asset inventory item reaches given thresholds. Such a threshold may be set via the PAM graphical user interface client 125 of the physical asset management system 105 by the user 160, FIG. 1.
3. Maintaining track of temporarily removed equipment items, including faulty parts.
4. Backing-up all of its asset inventory data to a back-up data storage device and top restore its online asset inventory data from the back-up data storage device.
5. Exporting physical asset management data and statistics in a variety of protocol format files, such as an ASCII format file.
6. Supporting navigation toward and from other network management layer applications.
7. Monitoring up to 1000 network element nodes in the network 110.
8. Invoking an online, context-sensitive help system via the PAM graphical user interface client 125.

In at least one embodiment of the physical asset management application 155, the physical asset management application 155 is at least partially based on an object model and a dynamic model. The object model defines the static object data model for each equipment item and its management. The dynamic model describes certain interactions between the objects themselves and between the objects and systems external to the apparatus 100.

In such an embodiment, the object model covers both off-line view (features) and on-line view (features). In operation, the object model is decomposed and split into an on-line sub-object model and an off-line sub-object model. The integrity of the inventory asset objects between the on-line sub-object model and the off-line sub-object model is achieved via the physical asset server 120. In this manner, informational binding at the physical asset server 120 provides integrity of the inventory objects between on-line and off-line sub-objects.

The physical asset management application 155 supports physical equipment management and administration for both on-line asset inventory items and off-line asset inventory items. The physical asset inventory application 155 also supports NE software management and updates. Examples of asset inventory items include boards, equipment holder bays, shelves, slots, software, network elements, equipment protection groups, and element management systems. Depending on whether an item is installed or un-installed, it may be an on-line or off-line asset inventory item.

During installation and de-installation of asset inventory items in the network, their on-line view and off-line view will be at least partially aligned, except in instances in which an asset inventory item does not provide necessary information for such alignment. The physical asset management application 155 shall be responsible for online equipment item configuration and provisioning thereof that is not associated with specific features and knowledge of network elements and element management systems.

In accomplishing physical equipment inventory management using the physical asset management (PAM) system 105, the off-line equipment inventory functionality is incorporated with the on-line equipment management functionality of the communication network management system via a physical asset server 120, FIG. 1. The physical asset server 120 maintains the information consistency between the on-line persistent asset database 140 and the off-line inventory database 130. Accordingly, the physical asset server 105 provides informational binding between on-line and off-line asset inventory whenever installation and/or de-installation of any asset inventory items are performed. A de-installed asset inventory item is an example of an un-installed inventory asset item.

In at least one embodiment of the physical asset management application 155, the physical asset management application 155 supports updating of network equipment inventory when an un-installed network equipment item is installed. Updating the network equipment inventory in this manner implies that a network equipment item creation notification is issued to the physical asset management system 105 from the element management system (EMS) in which the un-installed network equipment item is installed. This notification is issued the first time that the now installed network equipment item is activated (also referred to herein as when the network equipment item is initialized).

In at least one embodiment of the physical asset management application 155, the physical asset management application 155 provides the user 160 with the capability to retrieve various static network element information and dynamic network element information. Examples of such static network element information include a network element manufacturer name, a network element user label, a network element identifier, a network element type and a network element geographical location. Examples of such dynamic network element information include installed shelf identification information, occupied slot identification information and unoccupied slot identification information. The user 160 shall be able to retrieve the time and the date a network element was initialized.

In at least one embodiment of the physical asset management application 155, the physical asset management application 155 provides the user 160 with the capability to retrieve network element information by selected fields, individually or in combination, using Boolean operations or to retrieve network element information for the entire network 110. Examples of such selected fields include fields designating static network element information, fields designating a time and/or a date that the network element was initialized fields designating network elements with one or more empty slots.

In at least one embodiment of the physical asset management application 155, the physical asset management application 155 also provides the user 160 with the capability to determine the number of each type of network elements. The number of each type of network element may be determined according to network criterion such as equipment management domain, a specified geographical location or for the entire network 110.

In at least one embodiment of the physical asset management application 155, the physical asset management application 155 provides the user 160 with the capability to retrieve a report of revision levels of an installed network element, assuming the network element provides such version history information of the revision levels. An example of the revision level includes the version level of network element hardware and/or firmware. After a network element has been installed, the user 160 is able to retrieve the time and the date of the NE installation and the current operational state. The user 160 is able to determine how much capacity, in theory, can be added the network element.

In at least one embodiment of the physical asset management application 155, the physical asset management application 155 supports updating of network equipment inventory when an un-installed board is installed or when an installed board is de-installed. Updating board inventory in this manner implies that a board creation notification or a board deletion notification, respectively, is issued to the physical asset management system 105 from the element management system (EMS) in which the board is being installed or de-installed. Such a notification is issued whenever the network element is activated after the board is installed or de-installed.

It should be noted that when a board is de-installed from a corresponding slot or is inserted into a pre-provisioned slot, an attribute value change notification for the slot is issued rather than a board deletion notification or board creation notification, respectively. Accordingly, any attribute value change notification on the slot in any element management system is sent to the physical asset management system 105.

In at least one embodiment of the physical asset management application 155, the physical asset management application 155 provides the user 160 with the capability to retrieve various static board information and dynamic board information. Examples of such static board information include a board identifier, a board CLEI code, a board circuit pack type, a board Part number, a board serial number, a board asset state, a board capacity (e.g. number of ports, if the board is a line board), a board revision level, a board vendor name, a board unit price, a board purchase date and a board location. Examples of such dynamic network element information include board installation date and time information, current operational and/or administrative state information for the board, board protection information and board availability status.

In at least one embodiment of the physical asset management application 155, the physical asset management application 155 provides the user 160 with the capability to configure one or more ports of an installed board, providing the one or more ports are configurable.

In at least one embodiment of the physical asset management application 155, the physical asset management application 155 provides the user 160 with the capability to retrieve board information by selected fields, individually or in combination, using Boolean operations or to retrieve board information for the entire network 110. Examples of such selected fields include fields designating static board information.

In at least one embodiment of the physical asset management application 155, the physical asset management application 155 provides the user 160 with the capability to determine the number of circuit pack type associated with a board. The number of each circuit pack type associated with the board may be determined according to network criterion such as a specified network element, a specified element management system, a specified geographical location or for the entire network 110.

In at least one embodiment of the physical asset management application 155, the physical asset management application 155 provides the user 160 with the capability to accomplish one or more of the following operations.

1. Retrieving a report containing the revision levels of a board, if such information is accessible for the board from element management system associated with the corresponding network element.
2. Determine the oldest revision level of a board type for a specified network element.
3. Determine the physical location of all boards of a specified version and/or revision level.
4. Retrieving tabulating work and repair statistics of the boards on per circuit pack type basis.
5. Retrieving tabulating work and repair statistics of the boards on vendor/unit price basis.

In at least one embodiment of the physical asset management application 155, the physical asset management application 155 supports updating of equipment holder inventory when an equipment holder is installed or is de-installed. A bay and a shelf are examples of equipment holders.

In at least one embodiment of the physical asset management application 155, the physical asset management application 155 provides the user 160 with the capability to retrieve applicable information associated with a specified equipment holder. Examples of information associated with specified types of equipment holders include equipment holder type, equipment holder serial number, equipment holder location, equipment holder unit price, equipment holder purchase date equipment holder status and applicable circuit pack type(s). In such an embodiment, physical asset management application 155 provides the user 160 with the capability to determine which un-populated board slots are not active and not able to receive a board due to the presence of other boards in the system.

In at least one embodiment of the physical asset management application 155, the physical asset management application 155 provides the user 160 with the capability to retrieve applicable information associated with a specified software application. Software user label, software operational state and software revision levels are examples of information associated with a specified software application.

PAM View Object Classes

As mentioned above, in at least one embodiment of the physical asset management system 105, FIG. 1, the physical asset management system 105 is based on an object model and a dynamic model. The object model includes a plurality of Pam view object classes (generically referred to as object classes). Each object in the object class has at least one object class attribute. Furthermore, each object class supports at least one functional operation. Following are examples of such object classes included in the object model and corresponding functional operations.

Board Object Class

An instance of a board object class represents a type of circuit pack which can be physically plugged into or pull off from a slot. Examples of attributes of the board object class include:

ID: the value of this attribute uniquely identifies an instance of this class.

Version: this attribute identifies the version number of this class.

Vendor Name: this attribute indicates the vendor name.

Unit Price: this attribute indicates the unit price of this product.

Purchase Date: this attribute indicates when this product item was purchased.

Serial Number: the value of this attribute uniquely identifies an instance within this product category.

Automatic Number: this attribute is used to identify an instance within this product category if a system-readable serial number is not available. Therefore this attribute is a substitute for serial number and is automatically generated by system when the board is installed.

Part Number: this attribute identifies product category.

User Label: the attribute is used to identify the name of this product type.

Circuit Pack Type: this attribute identifies the circuit pack type (e.g. CLEI code).

Operational State: an indication of the operational state of the Board. Operational Status is a read-only attribute. The set of its permitted value is {enabled, disabled}.

Administrative State: an indication of whether or not the board is locked or unlocked. The set of permitted value is {locked, unlocked}.

Availability Status: this attribute indicates the current availability status of this board instance. The set of permitted values is {empty, in test, failed, off-line, not installed}.

Protection: the read-only attribute identifies whether a protection scheme is associated with this circuit pack, and what role (protecting or protected) in the protection system. The set of permitted values is {null, protecting, protected}. Value null indicates no protection is used.

Resource Pointer: the read-only attribute identifies the resource circuit pack object which is protecting this instance or protected by this instance within the protection group.

Protection Status: the read-only attribute indicates the status of the protection switch of this instance.

Location: this attribute indicates the geographical location name.

Capacity: this attribute is used only for line board and conveys the information of port signal rate list of this board.

Asset State: this attribute indicates whether this instance is an online inventory item or off-line inventory item.

Installed Time: records the time at which this item is currently installed online.

Removal Time: records the time at which this item is de-installed. When the item remains installed, the value of this attribute shall be Null.

Worked Time: indicates the accumulate time this item has correctly worked.

Repaired Times: indicates the total times this item has been repaired so far.

Examples of operations supported for the board object class include:

Query: this operation is used to get information concerning the attributes of a board.

Edit: this operation is used to edit those attributes not relevant to the operational features of a board.

Provisioning: this operation is used to configure any configurable attributes of a board.

Alarms: this operation is used to access current outstanding alarm information associated with a board.

Protection: this operation is used to access protection information of a board and its protection group. If no equipment protection is available/modeled for the board, the return value shall be Null.

The relationship between the asset state attribute and the availability status attribute is depicted below in Table 1.

TABLE 1

Relationship between the asset state attribute and the availability status attribute

| Asset State Attribute | Availability Status Attribute |
|---|---|
| installed | (empty) |
| installed | in Test |
| installed | failed |
| installed | off-Line |
| in stock | not-installed |
| in repair | not-installed |
| removed | not installed |

As depicted in Table 1, the availability status attribute provides more detailed information for an installed board, while the asset state attribute provides more detailed information for a not-installed board. It is contemplated that more sub-definitions of the availability status attribute and the asset state attribute are supported, when needed.

Equipment Holder Object Class

An instance of an equipment holder object class represents a bay or a shelf.

Examples of attributes of the equipment holder object class include:

ID: the value of this attribute uniquely identifies an instance of this class.

Vendor Name: this attribute indicates the vendor name.

Unit Price: this attribute indicates the unit price of this product.

Purchase Date: this attribute indicates when this product item was purchased.

Holder Type: this attribute indicates the type (bay or shelf) of this instance.

Configuration Type

Serial Number: the value of this attribute uniquely identifies an instance within this product category.

Automatic Number: this attribute is used to identify an instance within this product category if a system-readable serial number is not available. Therefore this attribute is a substitute for serial number and is automatically generated by system when the board is installed.

Part Number: this attribute identifies product category.

Location: this attribute indicates the geographical location name.

Asset State: this attribute indicates whether this instance represents an online inventory item or off-line inventory item.

Examples of operations supported for the equipment holder object class include:

Query: this operation is used to get information concerning the attributes of an equipment holder.

Edit: this operation is used to edit those attributes not relevant to the operational features of an equipment holder.

Slot Object Class

An instance of the slot object class represents a slot. Instances of this class are primarily applicable to on-line asset inventory management. Examples of attributes of the slot object class include:

ID: the value of this attribute uniquely identifies an instance of this class.

Holder Status: the read-only attribute indicates whether the slot is empty or occupied. The set of permitted values is {empty, in aCPL, not in aCPL, unknown}.

Acceptable Circuit Pack Type List: the read-only attribute identifies the types of circuit packs that can be supported by the slot.

Location: this attribute indicates the geographical location name.

An example of an operation supported for the slot object class includes:

Query: this operation is used to get information concerning the attributes of a slot.

Network Element Object Class

An instance of the network element object class represents a network element.

Examples of attributes of the network element object class include

ID: the value of this attribute uniquely identifies an instance of this class.

Vendor Name: this attribute indicates the vendor name.

User Label: the attribute is used to represent a label of this product type named by user.

Operational State: an indication of the operational state of the NE. Operational Status is a read-only attribute. The set of its permitted value is {enabled, disabled}.

Communication Link State: This read-only attribute identifies whether or not the communication link to EMS is capable of performing its normal functions.

Location: this attribute indicates the geographical location name.

Examples of operations supported for the equipment holder object class include:

Query: this operation is used to get information concerning the attributes of a network element.

Edit: this operation is used to edit those attributes not relevant to the operational features of a network element.

Software Object Class

An instance of the software object class represents a software application.

Examples of attributes of the software object class include:

ID: the value of this attribute uniquely identifies an instance of this class.

Version: this attribute identifies the version number of this instance.

Vendor Name: this attribute indicates the vendor name.

User Label: the attribute is used to represent a label of this product type named by user.

Operational State: an indication of the operational state of the NE. Operational Status is a read-only attribute. The set of its permitted value is {enabled, disabled}.

Examples of operations supported for the equipment holder object class include:

Query: this operation is used to get information concerning the attributes of software.

Edit: this operation is used to edit those attributes not relevant to the operational features of software.

Download: this operation is used to download the software to NE.

Element Management System

An instance of the element management system object class represents an element management system. Examples of attributes of the element management system object class include:

ID: the value of this attribute uniquely identifies an instance of this class.

Vendor Name: this attribute indicates the vendor name.

Location: this attribute indicates the geographical location name.

Examples of operations supported for the element management system object class include:

Query: this operation is used to get information concerning the attributes of element management system.

Edit: this operation is used to edit those attributes not relevant to the operational features of element management system.

Equipment Protection Group Object Class

An instance of the equipment protection group object class represents an EPG.

An equipment protection group is used to manage a protection system and identifies the protected (i.e., working or regular) equipment(s) and protecting (i.e., backup or standby) equipment(s) in the protection system. Examples of attributes of the equipment protection group object class include:

ID: the value of this attribute uniquely identifies an instance of this class in the associated network element.

Operational State: the read-only attribute identifies whether or not the protection mechanism represented by this object is capable of working.

Protection Group Type: the attribute indicates whether the protection scheme used is 1+1 or M:N. For equipment protection, the protection scheme is typically either 1:N or 1+1.

Revertive: the read-only attribute identifies whether or not the protection scheme used is revertive. The default value for this attribute shall indicate the revertive operation.

An example of an operation supported for the slot object class includes:

Query: this operation is used to get information concerning the attributes of an associated element management system.

Spare Parts Support Object Class

A support PAM data object, named as Spare parts, will be defined in this section. The key difference between this support PAM object and the other PAM objects defined above is that it is used for overall spare part (or repairing part) management of physical assets rather than individual item, and hence there shall be no any corresponding Q3 object for it. Examples of attributes of the spare parts support object class include:

Part Type: indicates the type of a particular spare part. The set of available values is {board, bay, shelf, etc}.

Part Number

User Label

Asset State

Quantity: indicates the total number of spare parts in stock (Asset State=stock) or faulty parts in repair (Asset State=repair).

Underflow Threshold: indicates the lower threshold for alert.

Overflow Threshold: indicates the upper threshold for alert.

Location

Version

Vendor Name

Examples of operations supported for the spare parts support object class include:

Query: this operation is used to get information concerning the attributes of spare parts.

Edit: this operation is used to edit those attributes not relevant to the operational features of the associated element management system.

Examples of special behaviors supported for the spare parts support object class include:

A threshold alarm will be reported whenever the quantity reaches either the underflow threshold or the overflow threshold.

A threshold alarm clear will be reported whenever underflow threshold is less than the quantity which is less than the overflow threshold.

Informational Binding On-Line and Off-Line Sub-Objects

Figure 2:
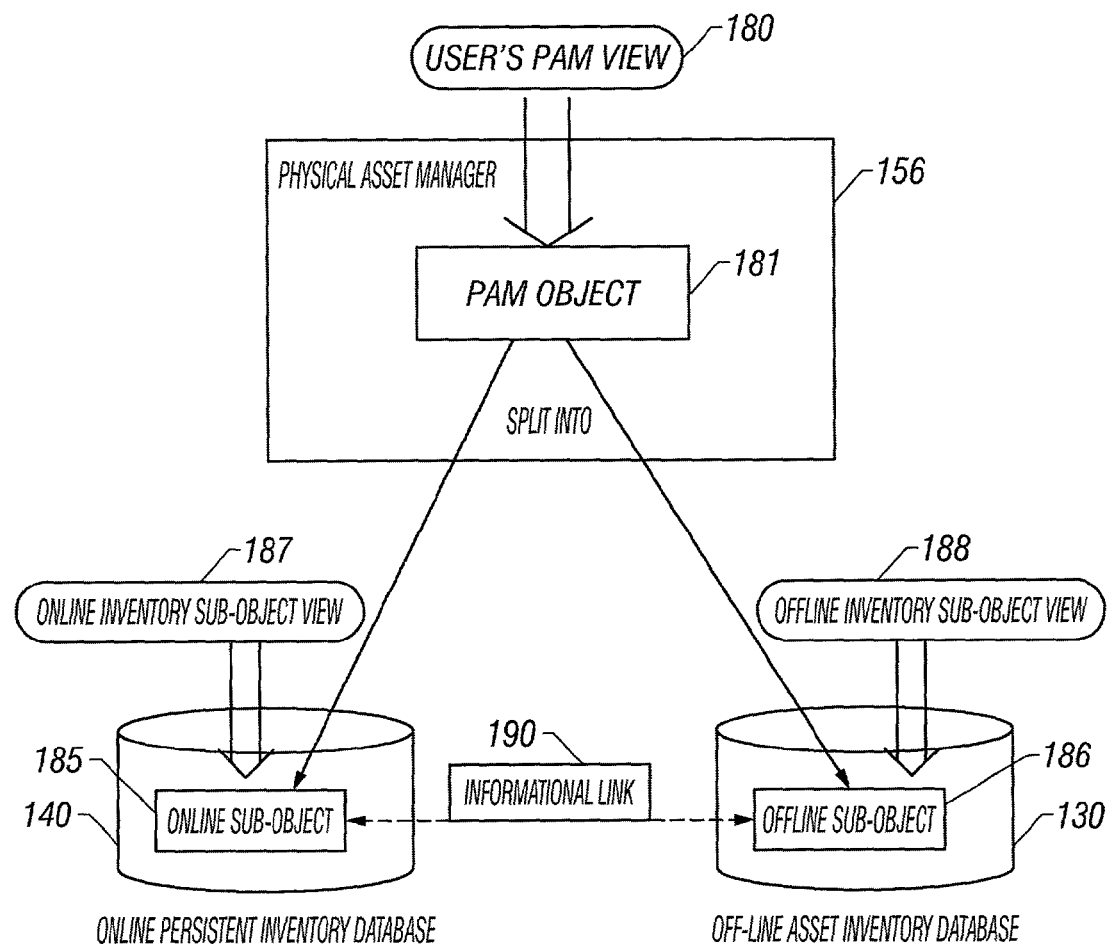
FIG. 2 is a diagrammatic view depicting an embodiment of a physical asset management view and corresponding sub-object views.

Referring to FIG. 2, in a physical asset management (PAM) view 180, an object 181 in an object class, such as the board object class and the equipment holder object class, is split into sub-objects in some instances. An on-line sub-object 185 and an off-line sub-object 186 are examples of such sub-objects. The on-line sub-object 185 and the off-line sub-object 186 may be individually viewed via an online inventory sub-object view 187 and an off-line inventory sub-object view 188, respectively.

When split into sub-objects, the object 181 includes at least one off-line attribute (such as Unit Price, Purchase Date, and so on) which is not relevant to its on-line operational behaviors. It should be understood that, in some instances, a data model of the off-line asset inventory database 130 does not have any on-line attributes of its corresponding object in the physical asset management view 180. Accordingly, in such an instance, the object in the physical asset management view 180 is split into sub-objects.

In one example, a board object of the physical asset management view 180 is split into an online sub-object and an off-line sub-object corresponding to an on-line board data model and an off-line board data model, respectively. In another example, an equipment holder object of the physical asset management view 180 is split into on-line sub-object and off-line sub-object corresponding to an on-line equipment holder data model and an off-line equipment holder data model, respectively.

In at least one embodiment of the physical asset manager 156, the online data model is supported via an on-line persistent object oriented database (OODB), while the off-line data model is supported via an off-line relational database (RDB). A support object model, such as that associated with spare boards and spare equipment holders, is supported via the online persistent OODB. The integrity of such support object in the physical asset management view 180 is provided for and maintained via physical asset manager 156.

The combination of object attributes, such as part number (PN) and serial number (SN) in one embodiment, provide an informational link 190 that binds the two sub-objects from the on-line data model and the off-line data model. Creating the informational link 190 includes performing an informational binding operation for associating the on-line sub-object 185 and the off-line sub-object 186. In general, data duplication between split the on-line sub-object 185 and the off-line sub-object 186 of the physical asset management view 180 is limited in order to promote improved data consistency and database storage efficiency. If there exist any inconsistent duplicated data attributes between the on-line sub-object 185 and off-line sub-object 186 of the object 181 in the physical asset management view object 180, such inconsistent duplicate data is aligned according to the associated on-line sub-object attributes.

On-line and off-line sub-objects each include one or more sub-object attributes. Furthermore, each sub-object supports at least one functional operation. Following are examples of such sub-objects and corresponding functional operations.

Board On-Line Sub-Object

Examples of attributes of a board on-line sub-object include:
  ID
  Serial Number
  Part Number
  Automatic Number
  Circuit Pack Type
  Operational State
  Administrative State
  Availability Status
  Location: this attribute indicates the geographical location name.
  Version
  User Label
  Capacity
  Installed Time
  Removal Time Examples of operations supported for the board online sub-object include:
  Provisioning: this operation is used to configure any configurable attributes of a board.
  Alarm: this operation is used to access current outstanding alarm information associated with a board.
  Protection: this operation is used to access protection information of a board. If no equipment protection is available/modeled for the board, the return value shall be Null.

Board Off-Line Sub-Object

Examples of attributes of a board off-line sub-object include:
  Version
  Vendor Name
  Unit Price
  Purchase Date
  Serial Number
  Part Number
  Automatic Number: this attribute is used to identify an instance within this product category if a system-readable serial number is not available. Therefore this attribute is a substitute for serial number and is automatically generated by system when the board is installed.
  User Label
  Asset State
  Worked Time
  Repaired Times Examples of operations supported for the board off-line sub-object include:
  Query
  Edit Equipment Holder Online Sub-Object Examples of attributes of an equipment holder on-line sub-object include:
  ID
  Serial Number
  Part Number
  Automatic Number
  Location: this attribute indicates the geographical location name for on-line site.
  Holder Type
  Configuration Type
  Asset State
  Installed Time
  Removal Time An example of an operation supported for the equipment holder on-line sub-object include:
  Query: this operation is used to get information concerning the attributes of an on-line equipment holder.

Equipment Holder Off-Line Sub-Object

Examples of attributes of an equipment holder off-line sub-object include:
  Vendor Name
  Unit Price
  Purchase Date
  Serial Number
  Part Number
  Automatic Number: this attribute is used to identify an instance within this product category if a system-readable serial number is not available. Therefore this attribute is a substitute for serial number and is automatically generated by system when the board is installed.
  Holder Type
  Location: this attribute indicates the store location in warehouse.
  Asset State
  Worked Time
  Repaired Times Examples of operation supported for the equipment holder off-line sub-object include:
  Query
  Edit Dynamic Model As mentioned above, in at least one embodiment of the physical asset management system 105, FIG. 1, the physical asset management system 105 is based on an object model and a dynamic model. The dynamic model captures the time-dependent behavior associated with the physical asset management system 105, FIG. 1, and the objects within the object model of the physical asset management system 105.

Dynamic Model—State Diagram

Figure 3:
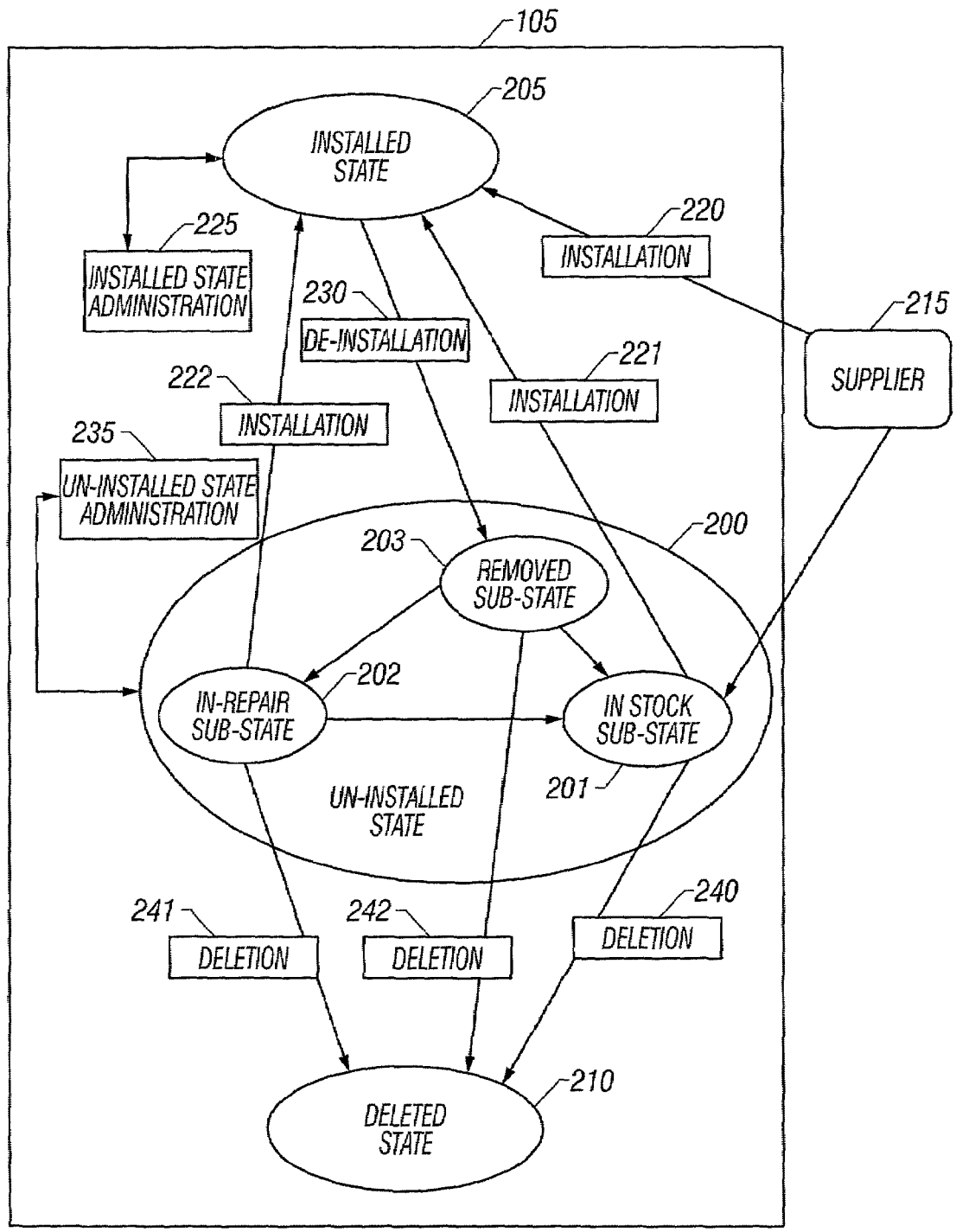
FIG. 3 is a block diagram view depicting an embodiment of a State diagram for objects in a physical asset management view.

As depicted in FIG. 3, an asset item managed by the physical asset management system 105 is in one of three basic states. An un-installed state 200 is where the asset inventory item is off-line. In at least one embodiment of the dynamic model, the un-installed state 200 is composed of a set of sub-states such as, for example, an in-stock sub-state 201, a repair sub-state 202 and a removed sub-state 203. An installed state 205 is where the asset inventory item is on-line. A deleted state 210 is where the item has been deleted from physical asset management. An asset inventory item is in the un-installed state if this item is in one of the sub-states of the set of sub-states.

When an asset item, such as an asset item purchased from a supplier 215, is placed under management of the physical asset management system 105, the asset item may be initially in the un-installed state 200 or in the installed state via a corresponding installation operation 220. When the asset item is in the un-installed state 200, the asset item is moved to the installed state 205 from the in-stock sub-state 201 or the in-repair sub-state 202 in response to performing a corresponding installation operation 221 or corresponding installation operation 222, respectively. Once in the installed state 205, an installed state administration operation 225 may be performed for initiating and/or enabling management of the asset item while in the installed state 205.

In response to performing a de-installation operation 230, the asset item is moved from the installed state 205 to the removed sub-state 203 of the un-installed state 200. Depending on the situation, the asset item may then be moved to the in-stock sub-state 201 or to the in-repair sub-state 202. When the asset item is in the un-installed state 200, an un-installed state administration operation 235 may be performed for initiating and/or enabling management of the asset item while in the un-installed state 200.

When in the un-installed state, the asset item may be moved to the deleted state 210. The asset item may be moved to the deleted state 210 from the in-stock sub-state 201, the in-repair sub-state 202 or the removed sub-state 203 via a corresponding deletion operation 240, a corresponding deletion operation 241, or a corresponding deletion operation 242, respectively. Examples of when the asset item is moved to the deleted state are when the asset item is inoperable, obsolete, over-stocked or otherwise not needed.

The asset item referred to in reference to FIG. 3 has a system-readable part number (PN) and a system-readable serial number (SN). As discussed above, the combination of part number and serial number provide the informational link 190, FIG. 2, that binds the on-line sub-object 185 and the off-line sub-object 186 of the asset item from the on-line data model and the off-line data model. Accordingly, the on-line sub-object 185 and the off-line sub-object 186 of the asset item referred to in reference to FIG. 3 are viewable via the PAM view 180, FIG. 2.

The system-readable part number (PN) and the system-readable serial number (SN) at least partially define system-readable identification of an asset item. As disclosed herein, system readable part number and system-readable serial number refers to the asset item having the part number and serial number stored electronically on an electronic element of an asset item. Examples of the electronic element include an EPROM, a radio frequency identification tag and other devices capable of retrievably storing the part number and the serial number. In this manner, the serial number and the part number can be automatically read. Thus, the potential for errors in reading the serial number and the part number is reduced. Techniques such as reading a bar code are prone to errors and require a separate manual step.

In instances in which an asset item does not have a system-readable part number (PN) and serial number (SN), there is no informational link that binds the between the on-line sub-object 185 and the off-line sub-object 186 of such an asset item from the on-line data model and the off-line data model. Accordingly, for such an asset item, the integral view (on-line and off-line) referred to in reference to FIG. 3 is not viewable via the PAM view 180. For such asset items, the on-line sub-object 185 and the off-line sub-object 186 are viewable through separate sub-object views, such as the on-line inventory sub-object view 187 and the off-line inventory sub-object view 188, FIG. 2.

Dynamic Model—Interaction Sequences

Figure 4:
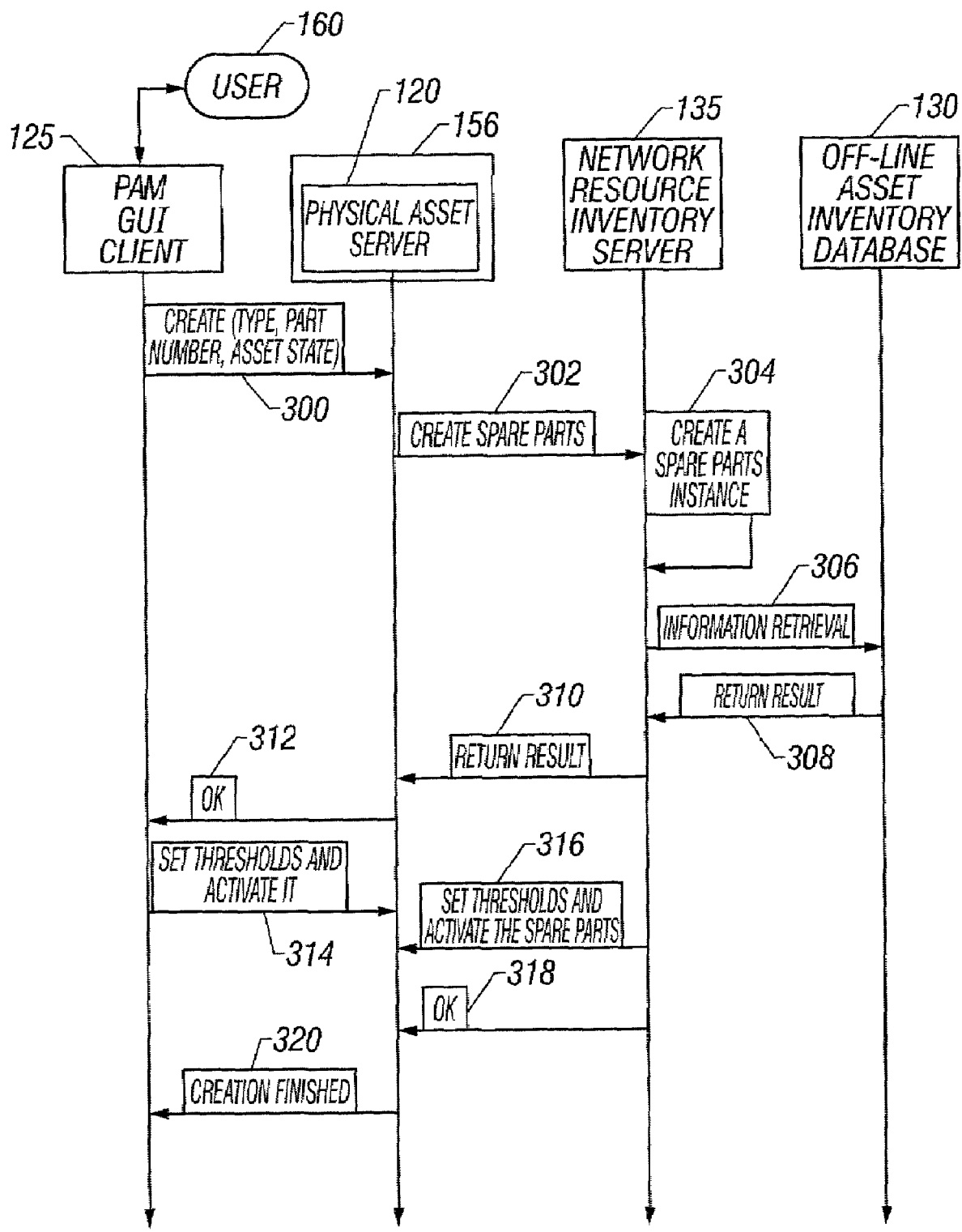
FIG. 4 is an interactive diagram view depicting an embodiment of a sequence of operations for creating a spare parts object.
Figure 5:
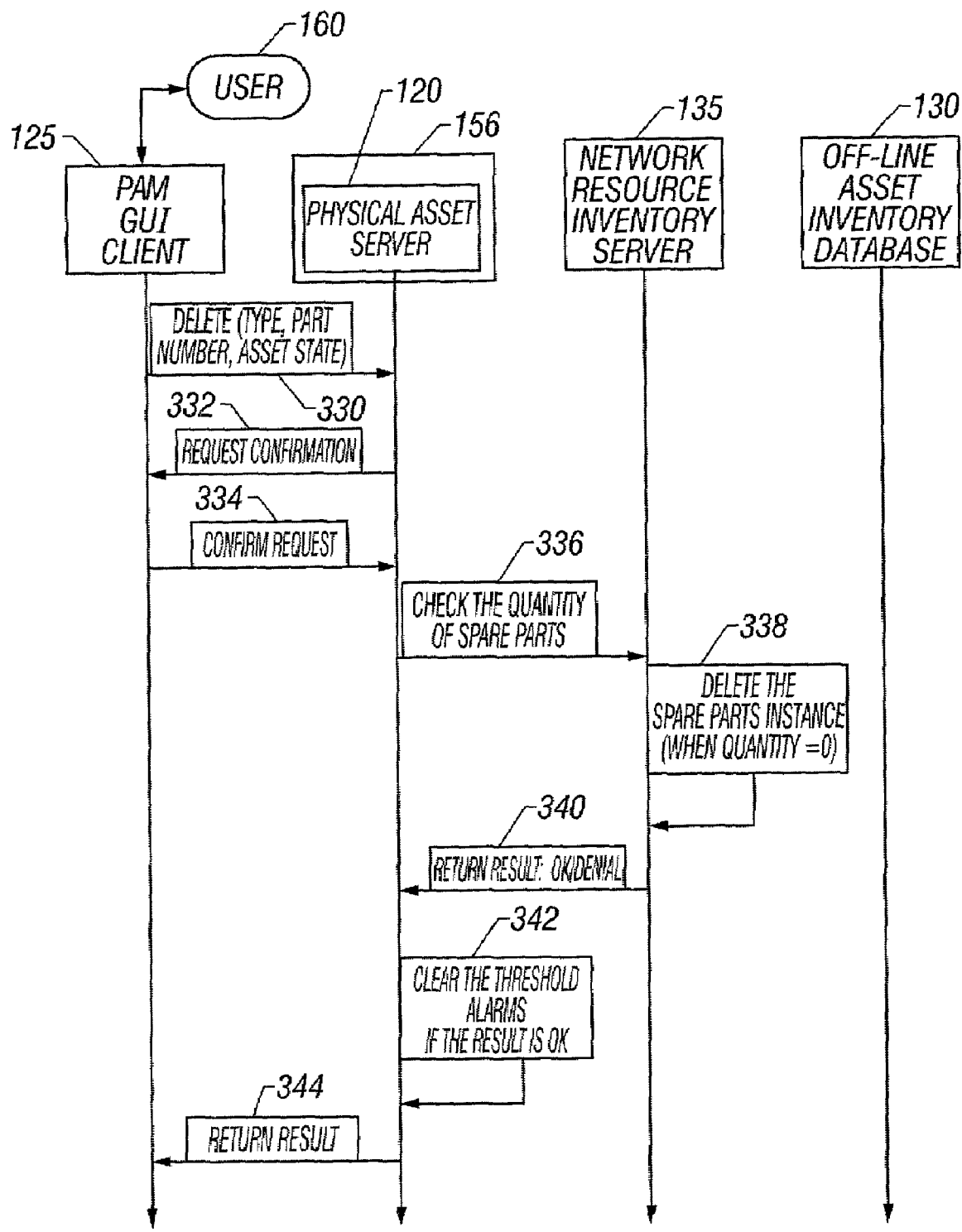
FIG. 5 is an interactive diagram view depicting an embodiment of a sequence of operations for deleting a spare parts object.

FIGS. 4 and 5 depict respective embodiments of interaction diagrams showing the behavior of the physical asset management system 105 in terms of sequences of interactions among architectural components of the physical asset management system 105. Specifically, the interaction diagrams in FIGS. 4 and 5 depict the sequence of operations for creating a spare parts object and deleting a spare parts object, respectively.

It should be understood that the physical asset server 120 is an integral component of the physical asset manager 156. Accordingly, operations performed by the physical asset manager include those performed wholly or in part by the physical asset server 120.

Referring to FIG. 4, an operation 300 is performed for requesting that a spare parts object be created. In at least one embodiment of the operation 300, the operation 300 includes the user 160 of the physical asset management system 105 interfacing with the PAM graphical user interface (GUI) client 125. In response to the operation 300 being performed, an operation 302 is performed for requesting that a spare parts instance is created. In at least one embodiment of the operation 302, the operation 302 includes the physical asset manager 156 requesting that the spare parts instance be created. In response to the operation 302 being performed, an operation 304 is performed for creating the spare parts instance. In at least one embodiment of the operation 304, the operation 304 includes the network resource inventory server 135 performing the operation 304.

To facilitate creating the spare parts instance, an operation 306 is performed for requesting retrieval of object information. In at least one embodiment of the operation 306, the operation 306 includes the network resource inventory server 135 performing the operation 306. In response to performing the operation 306, an operation 308 is performed for returning results associated with the object information retrieval request to the network resource inventory server 135 from the off-line asset inventory database 130. In response to performing the operation 308, an operation 310 is performed for returning results associated with spare parts creation request to the physical asset manager 156 from the network resource inventory server. In response to receiving the results associated with spare parts creation request, an operation 312 is performed for returning an object creation confirmation to the user 160 via the PAM GUI client 125. In at least one embodiment of the operation 312, the operation 312 is performed by the physical asset manager 156.

After the object creation confirmation is transmitted to the user 160, an operation 314 is performed for requesting that a user-designated threshold value be set and activated. In at least one embodiment of the operation 312, the operation 314 includes the user 160 interfaces with the PAM GUI client 125 for performing the operation 314. In response to the operation 314 being performed, an operation 316 is performed for setting and activating the user-designated threshold value. In at least one embodiment of the operation 316, the operation 316 includes the physical asset manager 156 performing the operation 316. In response to the physical asset manager 156 setting and activating the user-designated threshold value, the network resource inventory server 135 performs an operation 318 for returning a threshold activation confirmation to the physical asset manager 156. A spare parts notification is issued by the physical asset manager 156 when the spare parts threshold level exceeds a spare parts instance of the asset item. In response to receiving the threshold activation confirmation, the physical asset manager 156 performed an operation 320 for returning a creation completion confirmation to the user 160 via the PAM GUI client 125.

Referring to FIG. 5, an operation 330 is performed for requesting that a spare parts instance be deleted. In at least one embodiment of the operation 330, the operation 330 includes the user 160 of the physical asset management system 105 interfacing with the PAM graphical user interface (GUI) client 125. In response to performing the operation 330, an operation 332 is performed for returning a delete request confirmation the PAM GUI client 125. In response to an operation 334 of confirming the request being performed, such as by the user 160, for confirming the delete request confirmation, an operation 336 is performed for checking the quantity of spare parts. In at least one embodiment of the operation 336, the operation 336 includes the physical asset manager 156 interacting with the network resource management server 135.

When the quantity of spare parts is equal to zero (0), an operation 338 is performed for deleting the spare parts instance. In at least one embodiment of the operation 338, the operation 338 includes the network resource server 135 performing the operation 338. In response to the operation 338 being performed, an operation 340 is performed for returning a result to the physical asset manager 156. When the quantity of spare parts is equal to zero (0), the result is a deletion confirmation. When the quantity of spare parts is not equal to zero (0), the result is a deletion denial. In response to the quantity of spare parts being equal to zero (0), an operation 342 is performed for clearing a threshold value alarm. In at least one embodiment of the operation 342, the operation 342 includes the physical asset manager 156 performing the operation 342. After the operation 340 is performed and the operation 342 is performed, where applicable, an operation 344 is performed for returning a result to the user 160 via the PAM GUI client 125.

Informational Binding

Informational Binding—Asset Item with System-Readable Identification

An illustrative example of informational binding between on-line sub-objects and off-line sub-objects for an asset item with system-readable identification will now be discussed. As discussed herein above, system readable includes the identification (part number and serial number) required for informational binding is automatically captured by the EMS when the asset item is installed.

When an equipment item is installed for the first time, the on-line sub-object is created in an on-line core inventory store. The on-line sub-object will not be deleted from online inventory store even when the equipment item is de-installed. When an equipment item is added to the in-stock sub-state of the un-installed state (discussed above) for the first time, the off-line sub-object is first created in the off-line database.

As depicted in FIG. 2, a PAM view managed object is split into an on-line sub-object and an off-line sub-object. Informational binding between these two sub-objects enables the on-line sub-object and off-line sub-object to be integrated. The integration of the on-line sub-object and off-line sub-object enables an integral view (the PAM view) of PAM object to be provided. The integration of the on-line sub-object and off-line sub-object enables asset items in transition (such as from the installed state to the un-installed state) to maintain their inventory data consistency such that they can be effectively and efficiently tracked.

Figure 6:
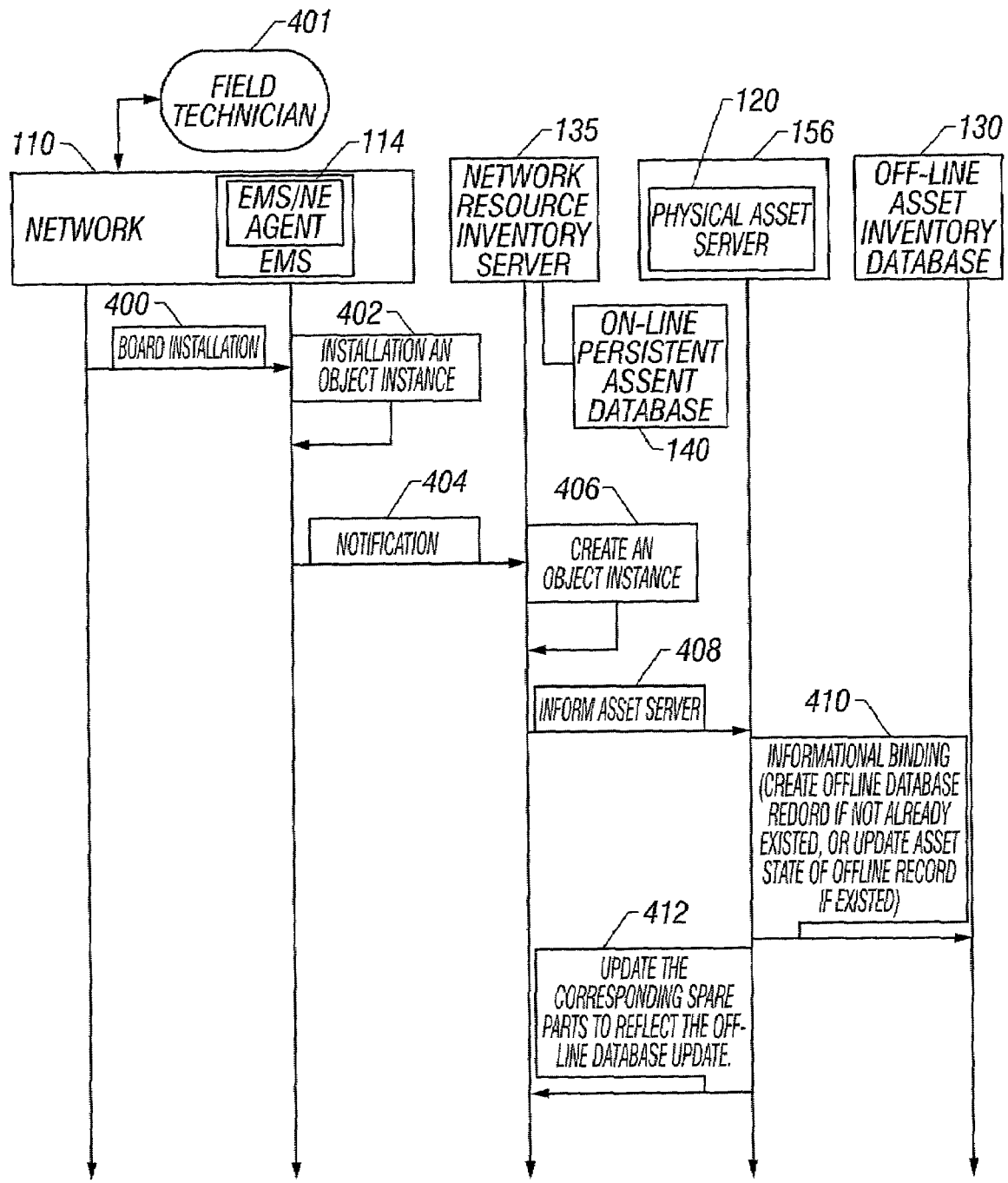
FIG. 6 is an interactive diagram view depicting an embodiment of a sequence of operations for installing a board.
Figure 7:
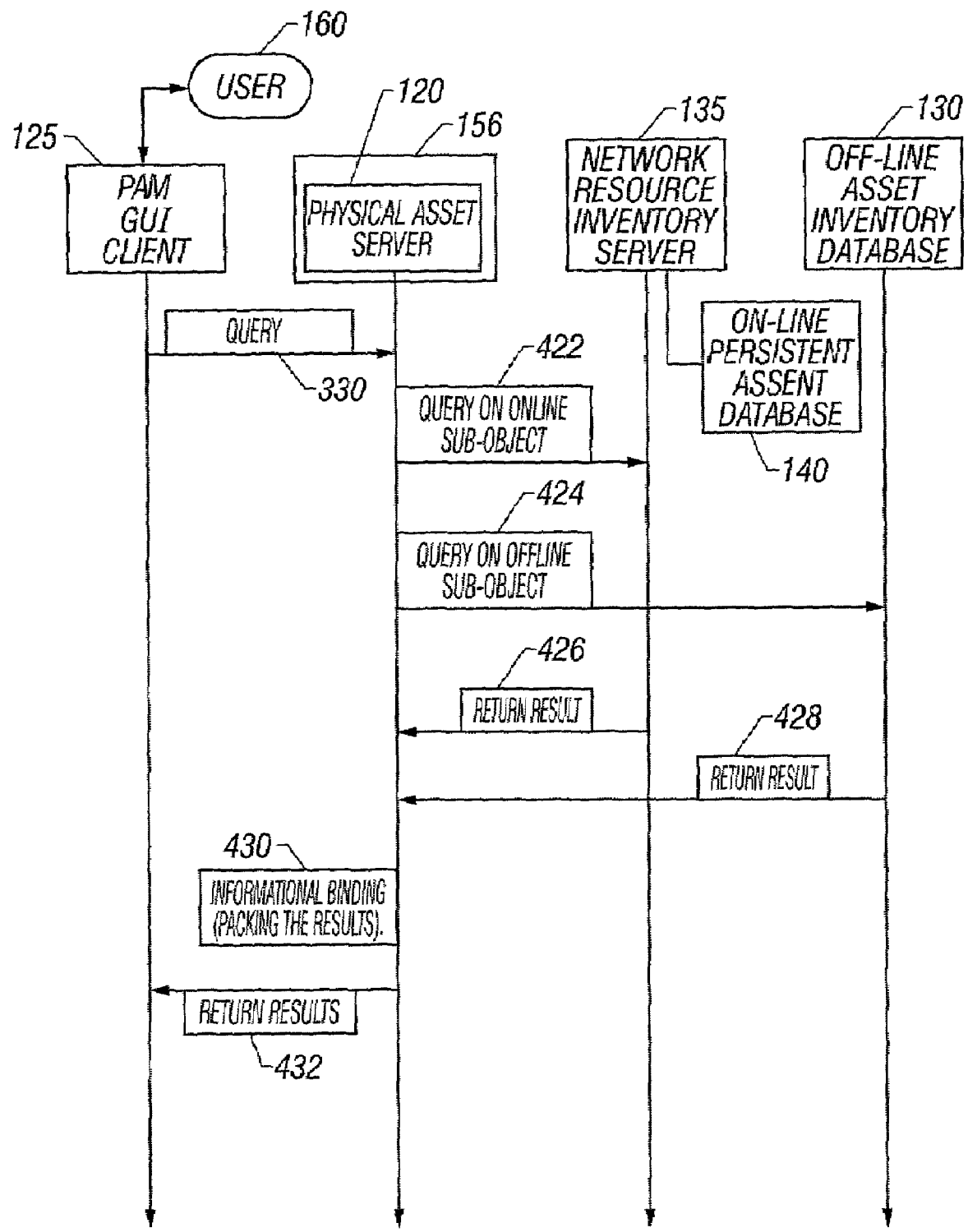
FIG. 7 is an interactive diagram view depicting an embodiment of a sequence of operations for performing a query of a board.
Figure 8:
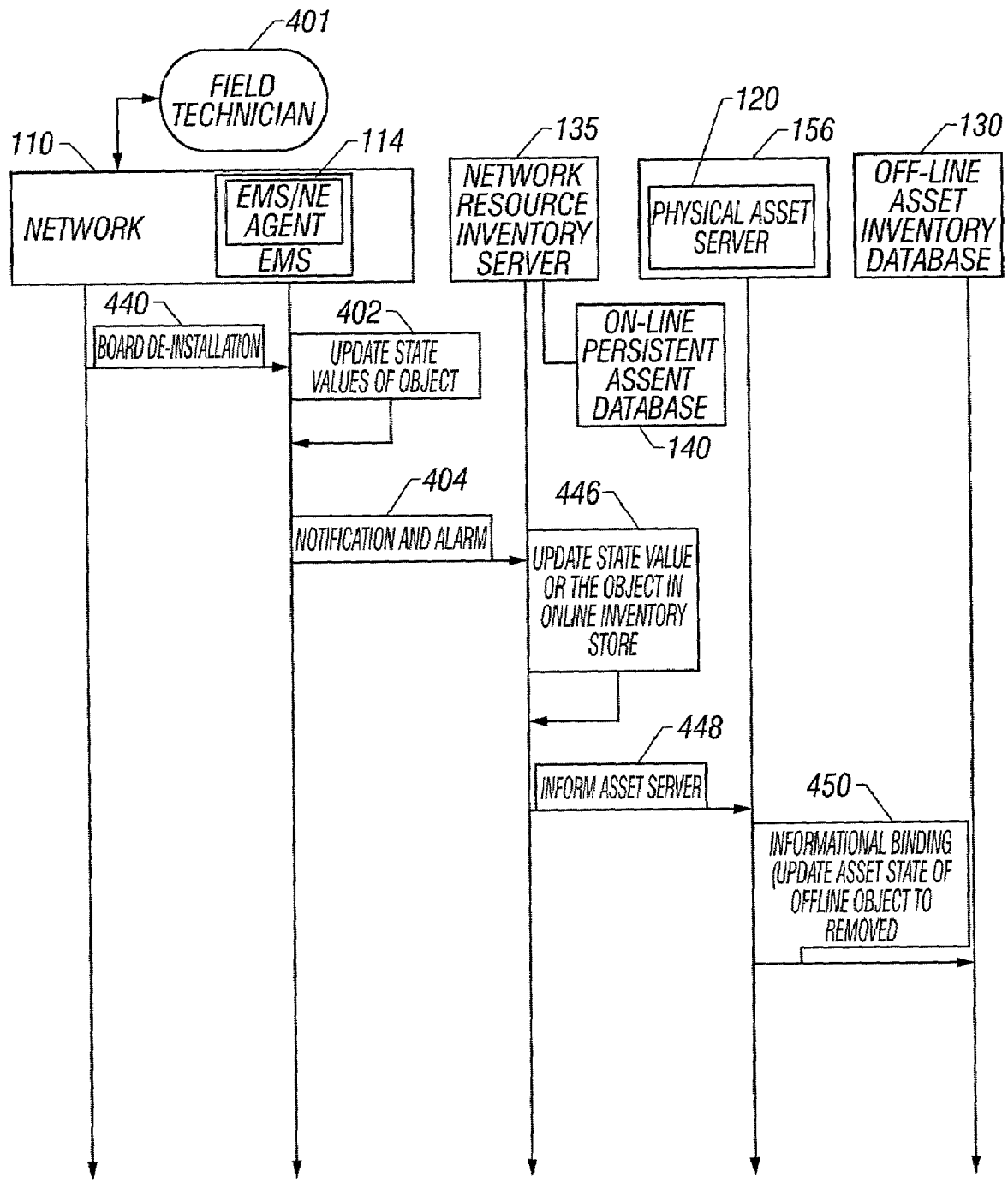
FIG. 8 is an interactive diagram view depicting an embodiment of a sequence of operations de-installing a board.

FIGS. 6, 7, and 8 depict embodiments of interaction diagrams for accomplishing installation of an equipment item, query of the equipment item, and de-installation of the equipment item, respectively. Specifically, the interaction diagrams in FIGS. 6, 7 and 8 depict the sequence of operations for installing a board, performing a query of the board, and de-installing the board, respectively. The equipment item, (i.e. the board) has a system-readable part number and a system-readable serial number. Accordingly, informational binding is performed based on the combination of part number and serial number of the inventory item, as discussed above.

Referring to FIG. 6, an operation 400 is performed, such as by a field technician 401, for installing a board in the network 110. As discussed above, the network 110 includes the element management system (EMS) 114. The element management system 114 includes the element management system/network element (NE) agent for enabling administrative operations for asset items associated with the EMS 114 to be facilitated.

In response to the operation 400 being performed, the EMS/NE Agent of the EMS 114 performs an operation 402 for instantiating an object instance corresponding to the board. In response to performing the operation 402, an operation is performed for transmitting an object instance instantiation notification to the network resource inventory server 135. In response to receiving the object instance instantiation notification, an operation 406 is performed for creating an object instance corresponding to the board. In at least one embodiment of the operation 406, the operation 406 includes the network resource inventory server 135 performing the operation 406 such as via a network management layer system-wide unified on-line inventory store.

In response to performing the operation 406, an operation 408 is performed for informing the physical asset manager 156 of the object instance creation. After the operation 408 is performed, an operation 410 is performed for facilitating informational binding between the off-line sub-object and an on-line sub-object associated with the object instance corresponding to the board. In at least one embodiment of the operation 410, the operation 410 includes creating an off-line asset inventory database record if such as record does not already exist, or updating such as record if it already exists. After the operation 410, an operation 412 is performed for updating a spare parts support object to maintain global inventory accuracy.

Referring to FIG. 7, an operation 420 is performed for initiating a query of an on-line sub-object associated with the object instance corresponding to the asset item such as a board. In at least one embodiment of the operation 420, the operation 420 includes the user 160 of the physical asset management system 105 interfacing with the PAM graphical user interface (GUI) client 125. In response to the operation 420 being performed, an operation 422 and an operation 424 are performed for querying the on-line sub-object and off-line sub-object, respectively, associated with the object instance corresponding to the asset item. In at least one embodiment of the operation 422, the operation 422 includes the physical asset manager 156 communicating with the network resource inventory server 135 for performing the operation 422. In at least one embodiment of the operation 424, the operation 424 includes the physical asset manager 156 communicating with the off-line asset inventory database 130 for performing the operation 424.

In response to the operations 422 and 424 being performed, an operation 426 and an operation 428 are performed for returning query results to the physical asset manager 156 from the network resource inventory server 135 and the off-line asset inventory database 130, respectively. In response to performing the operations 426 and 428, an operation 430 is performed for facilitating informational binding between the off-line sub-object and an on-line sub-object associated with the object instance corresponding to the asset item. In at least one embodiment of the operation 430, the operation 430 includes the physical asset manager 156 formatting (also referred to as packing) the results returned thereto by the network resource inventory server 135 and the off-line asset inventory database 130. In response to performing the operation 430, an operation 432 is performed for returning the results to the user 160, such as via the PAM GUI client 125.

Referring to FIG. 8, an operation 440 is performed, such as by the field technician 401, for de-installing the asset item from the network 110. In response to the operation 440 being performed, the EMS/NE Agent of the EMS 114 performs an operation 442 for updating, in the EMS 114, the state valued associated with the object corresponding to the asset item. In response to performing the operation 442, an operation 444 is performed for transmitting a de-installation notification to the network resource inventory server 135. In at least one embodiment of the operation 444, the operation 444 includes transmitting a de-installation alarm to the network resource inventory server 135.

In response to performing the operation 444, an operation 446 is performed for updating, in the on-line asset database 140, the state value associated with the object corresponding to the asset item. After performing the operation 446, an operation 448 is performed for transmitting an object update notification is transmitted to the physical asset manager 156. In response to the physical asset manager 156 receiving the object update notification, an operation 450 is performed for facilitating informational binding between the off-line sub-object and an on-line sub-object associated with the object instance corresponding to the asset item. In at least one embodiment of the operation 450, the operation 450 includes updating an asset state of the off-line sub-object associated with the asset item to indicate a removed (de-installed) sub-state.

Informational Binding—Asset Item with Bar Code-Readable Identification

In an instance in which an asset item has a bar code-readable serial number and a human-readable part number, but not a system-readable part number and/or a system readable serial number. In such instances, a network element is provided with a bar code reader interface for reading the part number and/or serial number bar codes during on-site installation of such an asset item. Reading the serial number bar code and the part number bar code, if provided, enables informational binding to be facilitated, even though a system-readable serial number and part number is not available.

In such instance where the asset item has a bar code-readable serial number, the bar code is scanned prior to installation of the asset item. After installation of the asset item, the EMS/NE agent instantiates an object instance corresponding to the asset item. Instantiating the object instance includes setting the serial number. Following instantiation of the of the object instance, the remaining sequence of operations associated with accomplishing informational binding are essentially the same as for an asset item with a system-readable serial number and part number, as depicted in FIG. 6. Facilitating a query of an asset item having the bar code-readable serial number is essentially the same as for the asset item having the system-readable serial number, as depicted in FIG. 7. Facilitating de-installation of an asset item having the bar code-readable serial number is essentially the same as for the asset item having the system-readable serial number, as depicted in FIG. 8. However, the serial number bar code is scanned, such as directly after the asset item is removed.

EML/NML Interface

Information Model

In the communication network apparatus 100, FIG. 1, the EML/NML interface 115 facilitates communication between the asset management system 105 and the communication network 110. In at least one embodiment of the EML/NML interface 115, EML/NML interface 115 includes a Q3 interface such as, for example, a TMN Q3 based Information Model interface offered by ALCATEL USA. The Q3-Series interface requires mapping between each PAM view object class, discussed above, to a corresponding Q3 managed objects.

Examples of such mapping are depicted below in Tables 2 and 3 below. Table 2 depicts mapping of PAM view objects to corresponding Q3 managed objects. Table 3 depicts mapping of attributes associated with the network element PAM view object class to corresponding Q3 managed object designations. As will be apparent to one skilled in the related art, in at least one embodiment of the information model, mapping as depicted in Table 3 will be provided for each of the PAM view object classes.

TABLE 2

Mapping of PAM view objects to corresponding Q3 managed objects

| PAM View Object | Q3 Managed Object |
| --- | --- |
| Board | circuitPackATT/Line + equipment protectionUnit |
| Equipment Holder | equipmentHolder (bay/shelf) |
| Slot | equipmentHolder (slot) |
| Network Element | mangedElementR1 + managementLink |
| Software | softwareR1 |
| EMS | ems |
| Equipment Protection Group | equipmentProtectionGroup |

TABLE 3

Mapping of attributes associated with a particular PAM view object class to corresponding Q3 managed object designations

| PAM View Object | Q3 Managed Object |
|---|---|
| ID | equipmentid |
| Vendor Name | vendorName |
| Version | version |
| User Label | userLabel |
| Operational State | operationalState |
| Communication Link State | — |
| Location | locationName |
| Installation Date | — |

The systems and methods disclosed herein enable network management tasks to be facilitated in an efficient and productive manner. Examples of network management tasks include network administration, network growth analysis, business plan implementation, network performance assessment and network cost reduction assessment. Network planning based on physical asset inventory management is one example of such a network management task. The network planning process as supported by the systems and methods disclosed herein are automated for enabling optimization of such network planning.

Automation of the network planning process results in improvements to the manner in which network management tasks are facilitated. The network planning process utilizes both on-line asset item usage information (including extension capacity of a network) and off-line spare parts in warehouse for facilitating the network planning process. Off-line spare parts and open warehouse space are two examples of resource availability information that is provided by the physical asset management system for facilitating the network planning process.

The integral physical asset management methodologies and system disclosed herein permits network planning to be automatically carried out according to designated criteria. The criteria or set of criteria is specified to optimize planning for a given network planning condition. Different network planning solutions resulting from different criteria is generated automatically by the physical asset management system. In this manner, such network planning solutions can be used for determining actual planning strategies.

In at least one embodiment of the physical asset management system, an inventory report is prepared for an asset item after creating an informational link associated with the asset item. Available inventory, available warehouse space and available network capacity are examples of available inventory as specified in the inventory report. In at least one embodiment of the physical asset management system, a statistical report is prepared after creating the informational link associated with the asset item. Information defining network operating performance, asset item capacity, asset item repair history, client usage and the like are examples of information included in a statistical report. The inventory report and statistical report are examples of network planning information.

Information associated with the inventory report and the statistical report are used in facilitating network planning. For example, based on a current network usage, capacity of a particular asset item and repair history for the particular asset item, the physical asset management system is capable of automatically determining the quantity of the particular asset item to maintain in stock. In another example, based on capacity for a particular asset item and current network usage, the physical asset management system is capable of automatically the projecting the quantity of the particular asset item need for a specified projected network usage.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical, chemical and electrical changes may be made without departing from the spirit or scope of the invention. For example, functional blocks shown in the figures could be further combined or divided in any manner without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

The invention claimed is:

1. A method for facilitating the management of a communication network asset item, comprising:
    assigning system-readable identification to an asset item of a communication network;
    receiving, at an asset manager, said system-readable identification of the asset item in response to installing the asset item in the communication network; and
    creating an informational link between an on-line sub-object of the asset item in an and an off-line sub-object of the asset item, wherein said system-readable identification enables the asset manager to create the informational link between the on-line sub-object of the asset item and the off-line sub-object of the asset item.

2. The method of claim 1 wherein:
    assigning said system-readable identification to the asset item includes assigning a serial number and a part number to the asset item; and
    receiving said system-readable identification includes receiving the serial number and the part number.

3. The method of claim 1 wherein assigning said system-readable identification to the asset item includes retrievably storing said system readable identification on an electronic element of the asset item.

4. The method of claim 1 wherein installing the asset item includes performing an installation operation, wherein the asset item is moved from an in-repair sub-state of an un-installed state to an installed state.

5. The method of claim 4, further comprising:
    performing a de-installation operation prior to performing the installation operation, wherein the asset item is moved from the installed state to the in-repair sub-state of the un-installed state.

6. The method of claim 1 wherein installing the asset item includes performing an installation operation wherein the asset item is moved from an in-stock sub-state of an un-installed state to an installed state.

7. The method of claim 6, further comprising:
    performing a de-installation operation prior to performing the installation operation, wherein the asset item is moved from the installed state to the in-stock sub-state of the un-installed state.

8. The method of claim 1 wherein creating the informational link includes retrieving the on-line sub-object of the asset item in an on-line persistent asset database and retrieving the off-line sub-object of the asset item in an off-line asset inventory database.

9. The method of claim 8 wherein retrieving the on-line sub-object of the asset item includes accessing the on-line persistent asset database via a network resource inventory server.

10. The method of claim 1 wherein creating the informational link includes performing an informational binding operation for associating information retrievable from an on-line persistent asset database with corresponding information retrievable from an off-line asset inventory database.

11. The method of claim 10 wherein the informational binding operation is performed in response to the physical asset manager receiving said system-readable identification.

12. The method of claim 11 wherein receiving said system-readable identification includes receiving a serial number and a part number stored on an electronic element of the asset item.

13. The method of claim 12, further comprising:
automatically accessing the serial number and the part number on the electronic element of the asset item when the asset item is installed in the communication network.

14. The method of claim 1, further comprising:
enabling the display of a physical asset management view of an object corresponding to the asset item in response to creating the informational link, wherein the on-line sub-object of the asset item and the off-line sub-object of the asset item are capable of being integrally viewed in the physical asset management view.

15. The method of claim 14 wherein enabling the display of the physical asset management view includes integrating information separately viewable in an on-line inventory sub-object view and in an off-line inventory sub-object view.

16. The method of claim 1, further comprising:
setting a spare parts threshold level associated with the asset item;
activating a spare parts support object associated with the off-line sub-object of the asset item; and
issuing a spare parts notification when the spare parts threshold level exceeds a spare parts instance of the asset item.

17. The method of claim 1, further comprising:
preparing network planning information after creating the informational link.

18. The method of claim 17 wherein preparing said network planning information includes preparing a statistical report.

19. The method of claim 17 wherein preparing said network planning information includes preparing an inventory report.

20. A method for facilitating the management of a communication network asset item, comprising:
assigning a serial number and a part number to an asset item of a communication network, wherein the serial number and the part number are electronically stored on an electronic element of the asset;
receiving, at an asset manager, the serial number and the part number of the asset item to an asset manager in response to installing the asset item in the communication network;
performing an informational binding operation for associating information retrievable from an on-line persistent asset database with corresponding information retrievable from an off-line asset inventory database, wherein said system-readable identification enables the asset manager to create an informational link between the on-line sub-object of the asset item and the off-line sub-object of the asset item;
enabling the display of an asset management view of an object corresponding to the asset item in response to creating the informational link, wherein the on-line sub-object of the asset item and the off-line sub-object of the asset item are capable of being integrally viewed in the asset management view; and
preparing network planning information after creating the informational link.

21. An apparatus for facilitating the management of a communication network asset item, comprising:
asset management system including asset manager connected to an on-line persistent asset database, to an off-line asset inventory database and to a communication network, and wherein the asset management system is capable of:
receiving system-readable identification of an asset item in response to installing the asset item in a communication network; and
creating an informational link between an on-line sub-object of the asset item and an off-line sub-object of the asset item, wherein said system-readable identification enables the asset manager to create the informational link between the on-line sub-object of the asset item and the off-line sub-object of the asset item.

22. The apparatus of claim 21 wherein the asset manager includes a asset server and a asset management application installed on the asset server.

23. The apparatus of claim 21 wherein receiving said system-readable identification includes receiving a serial number of the asset item and a part number of the asset item.

24. The apparatus of claim 21 wherein the asset item includes an electronic element and the asset item is electrically connected to the communication network for enabling said system-readable identification to be received from an electronic element of the asset item by the physical asset manager.

25. The apparatus of claim 21 wherein the asset management system includes a network resource inventory server connected between the physical asset manager and the on-line persistent asset database for enabling the on-line persistent asset database to be accessed via the physical asset manager.

26. The apparatus of claim 21 wherein the asset management system includes a network resource inventory server connected between the asset manager and the on-line persistent asset database thus enabling an informational binding operation to be performed for creating the informational link whereby information retrievable from an on-line persistent asset database is associated with corresponding information retrievable from an off-line asset inventory database.

27. The apparatus of claim 26 wherein the informational binding operation is performed in response to the asset management system receiving said system-readable identification when the asset item is installed in the communication network.

28. The apparatus of claim 21, wherein the asset management system is further capable of:
enabling the display of a asset management view of an object corresponding to the asset item in response to creating the informational link, the on-line sub-object of the asset item and the off-line sub-object of the asset item are capable of being integrally viewed in the asset management view.

29. The apparatus of claim 28 wherein enabling the display of the asset management view includes integrating information separately viewable in an on-line inventory sub-object view and in an off-line inventory sub-object view.

30. The apparatus of claim 21, further comprising:
preparing network planning information after creating the informational link.

31. The apparatus of claim 30 wherein preparing said network planning information includes preparing a statistical report.

32. The apparatus of claim 30 wherein preparing said network planning information includes preparing an inventory report.

33. An apparatus for facilitating the management of a communication network asset item, comprising:
   an asset management system including an asset manager connected to an on-line persistent asset database through a network resource inventory server, to an off-line asset inventory database and to a communication network through the network resource inventory server, the asset manager including an asset server and an asset management application installed on the asset server, and wherein the asset management system is capable of:
      receiving a system-readable serial number and a system-readable part number from an electronic element of the asset item in response to installing the asset item in a communication network;
      performing an informational binding operation for creating an informational link between an on-line sub-object of the asset item and an off-line sub-object of the asset item whereby information retrievable from the on-line persistent asset database is associated with corresponding information retrievable from the off-line asset inventory database, wherein said system-readable serial number and the system-readable part number enable the asset manager to create the informational link between the on-line sub-object of the asset item and the off-line sub-object of the asset item;
      enabling the of a physical asset management view of an object corresponding to the asset item in response to creating the informational link, wherein the on-line sub-object of the asset item and the off-line sub-object of the asset item are capable of being integrally viewed in the physical asset management view; and
      preparing network planning information after creating the informational link.

34. A computer program product, comprising:
   a computer program processable by a asset server of a asset manager; and
   an apparatus from which the computer program is accessible by the asset server;
   the computer program enabling the asset server to:
      receive system-readable identification of an asset item in response to installing the asset item in a communication network;
      create an informational link between an on-line sub-object of the asset item and an off-line sub-object of the asset item, wherein said system-readable identification enables the asset manager to create the informational link between the on-line sub-object of the asset item and the off-line sub-object of the asset item;
      enable the display of a asset management view of an object corresponding to the asset item in response to creating the informational link, wherein the on-line sub-object of the asset item and the off-line sub-object of the asset item are capable of being integrally viewed in the asset management view; and
      prepare network planning information after creating the informational link.

\* \* \* \* \*

UNITED STATES PATENT AND TRADEMARK OFFICE
CERTIFICATE OF CORRECTION

| | | |
|---|---|---|
| PATENT NO. | : 7,315,887 B1 | Page 1 of 1 |
| APPLICATION NO. | : 09/833085 | |
| DATED | : January 1, 2008 | |
| INVENTOR(S) | : Yao Liang and Maurice Lanman | |

It is certified that error appears in the above-identified patent and that said Letters Patent is hereby corrected as shown below:

In The Claims

Claim 1 is corrected as shown below:

1. A method for facilitating the management of a communication network asset item, comprising:
    assigning system-readable identification to an asset item of a communication network;
    receiving, at an asset manager, said system-readable identification of the asset item in response to installing the asset item in the communication network; and
    creating an informational link between an on-line sub-object of the asset item [[in an]] and an off-line sub-object of the asset item, wherein said system-readable identification enables the asset manager to create the informational link between the on-line sub-object of the asset item and the off-line sub-object of the asset item.

Signed and Sealed this
Twenty-fourth Day of February, 2015

Michelle K. Lee
*Deputy Director of the United States Patent and Trademark Office*